United States Patent
Rettenmaier et al.

(10) Patent No.: US 11,295,913 B2
(45) Date of Patent: *Apr. 5, 2022

(54) VACUUM CIRCUIT BREAKER

(71) Applicant: Siemens Energy Global GMBH & CO. KG, Munich (DE)

(72) Inventors: Thomas Rettenmaier, Graefenberg (DE); Norbert Wenzel, Erlangen (DE); Christian Schacherer, Deining (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/050,923

(22) PCT Filed: Apr. 16, 2019

(86) PCT No.: PCT/EP2019/059750
§ 371 (c)(1),
(2) Date: Oct. 27, 2020

(87) PCT Pub. No.: WO2019/206732
PCT Pub. Date: Oct. 31, 2019

(65) Prior Publication Data
US 2021/0233727 A1    Jul. 29, 2021

(30) Foreign Application Priority Data
Apr. 27, 2018 (EP) ..................... 18169856

(51) Int. Cl.
*H01H 33/664* (2006.01)
*H01H 33/662* (2006.01)

(52) U.S. Cl.
CPC .... *H01H 33/664* (2013.01); *H01H 33/66261* (2013.01)

(58) Field of Classification Search
CPC ............... H01H 33/664; H01H 33/666; H01H 33/66261; H01H 79/00; H01T 21/06; H01J 21/08; H02H 9/06; H02H 9/046; H02H 7/16
USPC ............... 218/139, 126, 140, 119, 154, 148; 313/146, 148, 547, 307; 315/330, 36; 361/13
See application file for complete search history.

(56) References Cited

U.S. PATENT DOCUMENTS

| | | | |
|---|---|---|---|
| 3,261,954 A | * | 7/1966 | Yonkers ................. H01H 33/66 218/118 |
| 3,321,598 A | | 5/1967 | Streater |
| 3,411,038 A | * | 11/1968 | Lee ........................ H01H 33/66 361/12 |
| 3,489,873 A | | 1/1970 | Kurtz et al. |

(Continued)

FOREIGN PATENT DOCUMENTS

GB        787846 A        12/1957

*Primary Examiner* — William A Bolton
(74) *Attorney, Agent, or Firm* — Laurence A. Greenberg; Werner H. Stemer; Ralph E. Locher

(57) ABSTRACT

A vacuum circuit breaker includes a vacuum circuit breaker tube having a vacuum housing in which a contact system is disposed. The contact system includes two contacts which are movable relative to one another. An electrical pre-arcing unit having an ignition electrode in the vacuum housing is provided for igniting an arc along an arc current path.

7 Claims, 3 Drawing Sheets

(56) References Cited

U.S. PATENT DOCUMENTS

| | | | | |
|---|---|---|---|---|
| 3,500,009 A | * | 3/1970 | Bell | H01H 9/54 |
| | | | | 218/1 |
| 3,679,474 A | | 7/1972 | Rich | |
| 3,816,798 A | | 6/1974 | Lafferty | |
| 8,575,509 B2 | * | 11/2013 | Marchand | H01H 33/666 |
| | | | | 218/126 |
| 8,861,144 B2 | * | 10/2014 | Shea | H01T 2/02 |
| | | | | 361/13 |
| 2011/0315662 A1 | | 12/2011 | Byron et al. | |

\* cited by examiner

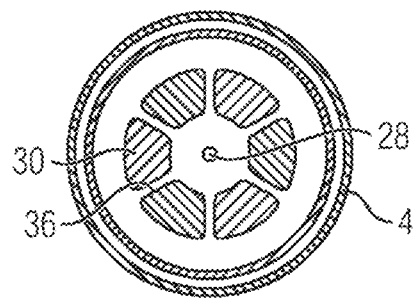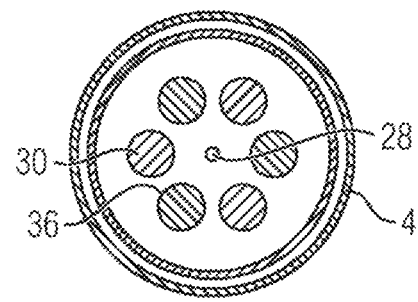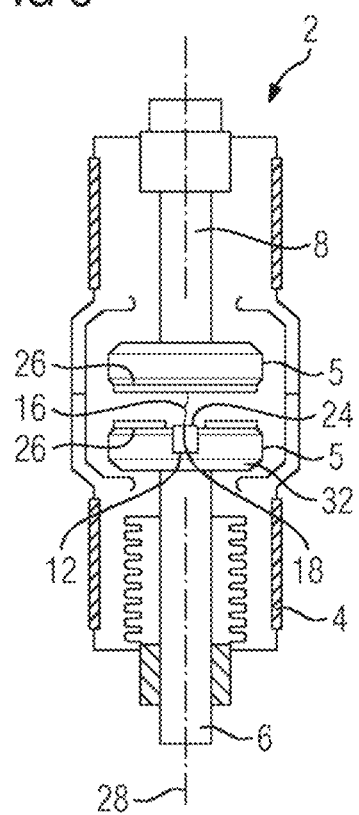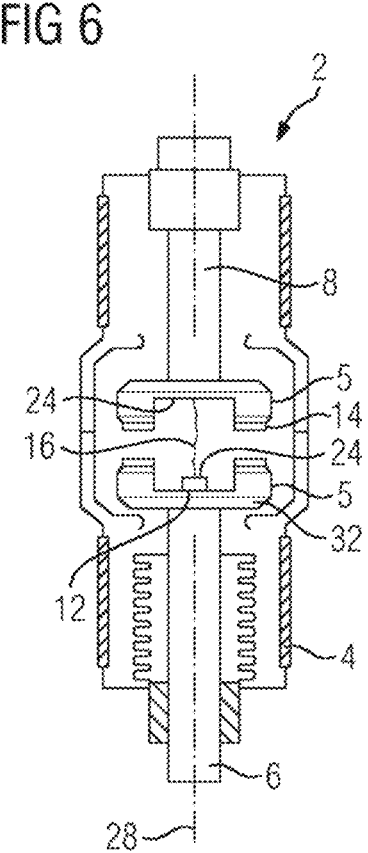

VACUUM CIRCUIT BREAKER

BACKGROUND OF THE INVENTION

Field of the Invention

The invention relates to a vacuum circuit breaker including a vacuum circuit breaker tube having a vacuum housing containing a contact system with two contacts disposed so as to move relative to one another, and an electrical pre-arcing unit having an ignition electrode disposed in the vacuum housing for igniting an arc along an arc current path.

In various systems for increasing or controlling the transmission power of high-voltage grids such as series compensation systems (referred to as Fixed Series Capacitor—FSC) or in power flow controllers (Universal Power Flow Control—UPFC or APCU), it is necessary to provide protective devices in the case of a grid fault, for example a short circuit or ground fault. The protection consists of a surge arrester and a bypass current path, which is closed in an electrically conductive manner if a grid fault occurs. The fastest possible reaction in the case of a grid fault is crucial for the protective effect. The bypass current path should typically be closed within two milliseconds (ms) and subsequently be able to carry the fault current for a time of a few seconds.

In accordance with the prior art, power semiconductors or a combination of a spark gap and circuit breakers are usually used for the exemplary applications described. In this case, power semiconductors are comparatively cost-intensive since they have to be designed for the short-circuit current for a time that is comparatively long for them. On the other hand, the parallel arrangement of a spark gap and a circuit breaker that is likewise used requires a very large installation space. Moreover, by virtue of its open design, the spark gap is susceptible to environmental influences such as, for example, icing or exposure to dust.

SUMMARY OF THE INVENTION

The problem addressed by the invention is to provide a mechanical switch that can very quickly make electrical contact in the event of a short circuit and is inexpensive to manufacture and less susceptible to environmental influences in comparison with the known switching devices.

The solution to the problem consists in a vacuum circuit breaker in which the two contacts have two geometrically separated current paths, a first current path is the arc current path and a second current path is a continuous current path and the two contacts have finger-shaped extensions along a switching axis, the extensions of the two contacts engage with one another and flanks of the finger-shaped extensions include contact surfaces of the arc current path, the contacts with the finger-shaped extensions are oriented along a switching axis, contact is made between contact surfaces of the continuous current path in the closed state, and contact surfaces of the arc current path in a closed state of the circuit breaker are disposed with no contact with respect to one another.

The vacuum circuit breaker according to the invention comprises a vacuum circuit breaker tube having a vacuum housing in which a contact system is arranged. The contact system has two contacts arranged so as to move relative to one another. The vacuum circuit breaker is distinguished in that there is provision for an electrical pre-arcing device that has an ignition electrode, arranged in the circuit breaker tube, for igniting an arc along an arc current path.

When a grid fault occurs, triggered by the pre-arcing device, an isolation separation between the continuous current contacts of the vacuum circuit breaker is first electrically bridged by the igniting of an arc. There is by nature no mechanical contact between arc contacts at this time. While the arc conducts the current, this also being able to be referred to here as a fault current, and hence the arc current path is electrically closed, the continuous current contacts, that is to say the contacts that actually carry current, are closed in the meantime. This is accomplished by means of a fast, ideally bounce-free, mechanical drive from the prior art. By igniting the arc current path, the pre-arcing unit acts in a similar manner to a known spark gap. Unlike in the prior art, however, this ignition device, with contacts arranged so as to move relative to one another, is integrated directly into a vacuum circuit breaker tube. In contrast to triggered vacuum switches, TVSs, which also have an integrated ignition device but exclusively fixed contacts, the arrangement according to the invention permits mechanical contact between contacts, which is advantageous for the continuous current mode. The arrangement according to the invention achieves a favorable design by using a conventional vacuum circuit breaker tube, which requires a smaller installation space in comparison with the arrangement from the prior art and is insensitive toward environmental influences.

According to DIN standard 28 400, a vacuum refers to a diluted gas or the corresponding state in which the pressure or density is lower than that of the surrounding atmosphere. This means that, if the pressure in a container is lower than the pressure of the atmosphere, that is to say of the air, that surrounds it, then there is a vacuum in this container. Preferably, a vacuum switching tube contains a high vacuum with a pressure of less than $10^{-3}$ hPa.

A vacuum circuit breaker comprises a vacuum tube, or called a circuit breaker tube, and a drive.

In an advantageous configuration of the invention, the contact system with its two contacts has two geometrically separated current paths. In this instance a first current path is the arc current path already described and the second current path is a continuous current path. This arrangement has the advantage that contact surfaces of the continuous current path are not damaged by the prior formation of an arc in their surface. There is no undesirable melting and welding between the contact surfaces of the continuous contacts. The continuous current path results from actual mechanical contact between the contacts and is suited to carrying large currents continuously, including fault or short-circuit currents besides rated currents.

In order to continue to prevent surface effects (e.g. undesirable welding of the contacts), it is furthermore expedient that contact surfaces of the arc contact in a closed state of the circuit breaker remain arranged with no contact with respect to one another. Only the contact surfaces of the continuous current path are in contact with one another in a closed state. These are then also used to conduct the current in the closed state; no further current flows via the contact surfaces of the arc current path that are not in contact.

It is expedient if the contact surfaces of the arc current path are larger than, preferably twice as large as, the contact surfaces of the continuous current path.

In an advantageous configuration of the invention, the two contacts have fingerlike extensions along a switching axis, wherein the extensions of the two contacts engage with one another. This fingerlike arrangement of the contacts allows the arc current path and the continuous current path to be isolated with little effort. This is expedient in particular if flanks of the fingerlike extensions comprise contact surfaces of the arc current path. Furthermore, it is expedient if these flanks forming the arc contact are arranged not absolutely parallel but rather at an acute angle with respect to one another.

In an alternative configuration of the invention, at least one of the contacts has a pot-shaped configuration, and a contact piece of the arc current path is arranged in the center of the pot-shaped contact. The term pot-shaped is understood in this instance to mean any type of contact, but preferably not necessarily with a circular cross section, that has a cutout or depression in the center of the contact surface, so that no contact takes place between the two contact surfaces of the two contacts in the region of this cutout or depression. Either one or both contacts can have this pot-shaped form. The cutout or depression in the center of the contact, which defines the pot shape, is suited to accommodating the contact piece of the arc current path. The arc current path in this case therefore runs separately from the continuous current path through the center of at least one contact. The design has the advantage that, in comparison with conventional contact systems, only a small technical modification is necessary by virtue of a cutout and an additional arc contact being introduced into the middle of a contact. Otherwise, an ordinary contact system can be used.

It is fundamentally expedient if the ignition electrode is already a contact piece of the arc current path, since in this way the arc current path can be defined in a simple manner. On the other hand, it may also be expedient for the ignition electrode to be mounted outside the contacts, in particular on a vapor shield, which normally concentrically surrounds the contact system. One or more ignition electrodes can be mounted in this instance.

A further part of the invention is the use of a vacuum circuit breaker tube for a short-circuiting device for shorting a circuit and hence for protecting a grid influencing system from a surge. A grid influencing system is understood in this instance to mean for example a series compensation system or a standardized power flow controller. Both are systems that are used to influence an electricity grid and that need to be switched to zero current or zero voltage within the shortest possible time in the event of a short circuit in order to avoid damage to these systems. As a result of its rapid formation of an arc current path, a switch as described is particularly well suited to isolating a grid influencing system from the electricity grid very quickly and hence preventing damage to said system.

Advantageous configurations of the invention and further features are described in more detail with reference to the figures that follow. These are schematic, purely exemplary configurations that do not constitute any limitation to the scope of protection.

BRIEF DESCRIPTION OF THE SEVERAL VIEWS OF THE DRAWING

FIG. 3 shows a cross section through a contact system as shown in FIG. 1 or FIG. 2, FIG. 4 shows an alternative cross section through a contact system as shown in FIG. 1 and FIG. 2, FIG. 5 shows a vacuum circuit breaker tube with a contact system and a pot-shaped contact having an ignition electrode arranged in the center, FIG. 6 shows an analogous circuit breaker tube as shown in FIG. 5 with two pot-shaped contacts.

DETAILED DESCRIPTION OF THE INVENTION

Figure 1:
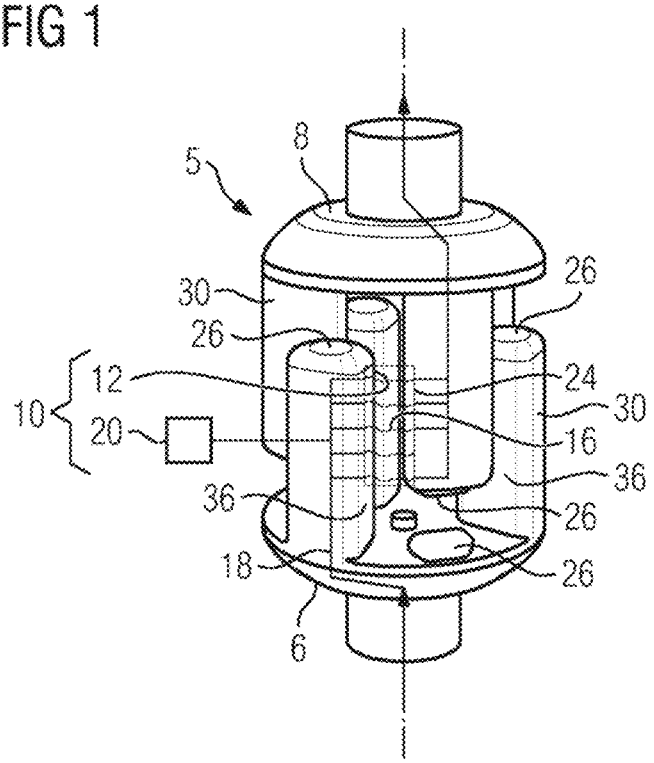
FIG. 1 shows a contact system with two contacts having contact fingers in the open state.
Figure 2:
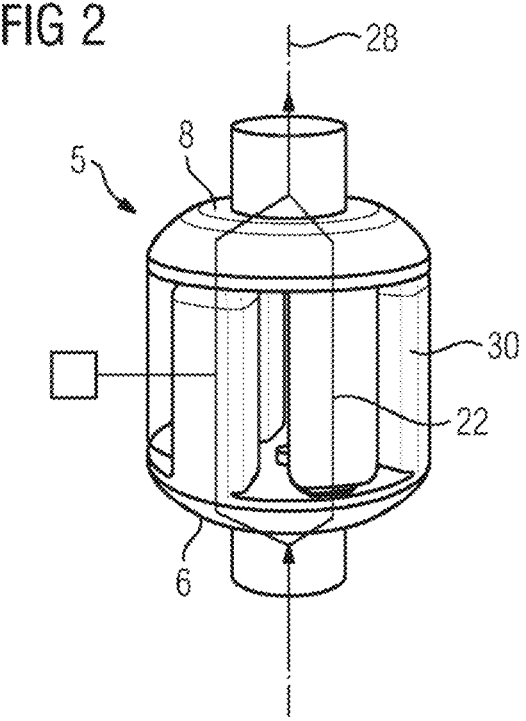
FIG. 2 shows the contact system from FIG. 1 in the closed state.

FIGS. 1 and 2 each depict a contact system 5 of a vacuum circuit breaker tube 2. For the sake of simplicity, these figures show just the contact system; a basic schematic cross section through a vacuum circuit breaker tube 2 is provided in FIGS. 5-8. In principle, the contact system 5 shown in FIGS. 1 and 2 is integrable in an analogous manner in a vacuum circuit breaker tube 2 as shown in FIG. 5.

The vacuum circuit breaker tube 2 has a housing 4, which, as already explained, is not depicted in FIGS. 1 and 2 for the sake of simplicity. This housing 4 contains a vacuum, which means that there is a lower pressure in this region in comparison with atmospheric pressure; there is preferably a high vacuum. In the vacuum circuit breaker tube 2 described, in contrast to gas circuit breakers there is preferably no quenching gas and no insulating gas. In this case the arc carrying the fault current is what is known as a vacuum arc, which is fed by the material of the contacts or of the pre-arcing device in the arc current path. In general, the arc may also be an arc burning in a gas having low pressure (lower than atmospheric pressure, see above).

The contact system 5 has two contacts; in principle, both contacts could be configured as a moving contact, but normally only one contact 6 is configured as a moving contact and a second contact is a fixed contact 8. The moving contact 6 in this instance is connected to a drive, which is not depicted here.

The contacts 6 and 8 in FIGS. 1 and 2 have fingerlike extensions 30 that are oriented along a switching axis 28. These extensions 30 engage with one another, a cross section through the contact system 5 from FIGS. 1 and 2 being provided in each of FIGS. 3 and 4. Different possible cross sections through the extensions 30 are depicted in this case, FIGS. 3 and 4 also depicting the vacuum-tight housing 4 of the vacuum circuit breaker tube 2 in addition. In the examples in FIGS. 1-4, three fingerlike extensions 30 are depicted for each contact; in principle, the number can vary, of course. It may also be expedient for each contact to have just one extension 30; this can then have a semi-annular cross section, for example, in each case.

Furthermore, the vacuum circuit breaker tube is equipped with a pre-arcing device 10, wherein the pre-arcing device 10 has at least one ignition electrode 12 and preferably ignition electronics 20, which provide an electrical signal to the ignition electrode 12 in the event of a short circuit, when the switch needs to be closed very quickly. The effect of this is that electrical charges are present in the region of contact surfaces 24 for what is known as an arc current path 18, and a flashover in the form of an arc occurs between two contact surfaces 24. When a grid fault occurs, the contact is therefore first bridged by the arc 16 ignited as described. While the arc 16 conducts the current, the contacts 6 and 8 are then closed mechanically by the mechanical drive, resulting in contact between contact surfaces 26 of a continuous current path 22.

This sequence is therefore expedient because the arc 16 can be ignited more quickly (in less than 2 ms) and hence the current can flow via said arc for a short time until the somewhat slower mechanical contact is closed.

In this way, an effect similar to what is already the case from the combination of what is known as a spark gap with a circuit breaker in accordance with the prior art is achieved in an integrated switch. However, the design described requires a much smaller installation space; at the same time, the vacuum circuit breaker tube 2 is much less susceptible to environmental influences than what is known as a spark gap, for example.

In principle, it would be possible to geometrically combine the arc current path 18 and the continuous current path 22. That is to say, similarly to what is described in FIG. 8, the arc 10 could be effected between two contact surfaces 26 of the contacts 6 and 8 that have a planar configuration. As a result of the burnout of the contact surfaces 26 with the arc 16, however, a melting zone arises at the surface, which means that the contact surfaces 26 can weld to one another when the contacts 6 and 8 close. When they reopen, this weld is torn open and microscopically fine acicular surface roughnesses are produced that can adversely affect the electrical field during opening and closing of the contacts 6 and 8.

For this reason, it is expedient that, as depicted in FIGS. 1 and 2, the arc current path 18 is geometrically separated from the continuous current path 22. The arc current path 18 is depicted in FIG. 1. It runs along the extensions 30, and the arc current path 16 then jumps over flanks 36 of the extensions 30 at contact surfaces 24 of the arc current of the corresponding flank 36 and of the corresponding contact surface 24. FIG. 2 depicts the closed state of the contact system 5; the arc 16 between the flanks 36 has extinguished and the current flows via the continuous current path 22, the contact surfaces 26 of the two contacts 6 and 8 being in contact with one another. This flow of current is now continuously stable.

In contrast to the prior art, in this case in an integrated manner in a switch, an arc is first switched, which arc leads very quickly to a flow of current until the slower mechanical switching process via the continuous current path is provided. In this case, the continuous current path 22 and the arc current path 18 are geometrically separated from one another, which can be fashioned by the arrangement of the fingerlike extensions 30. In the closed state of the contact system 5 the contact surfaces 24 for the arc current path 18 are not in contact with one another. Consequently, welding between the individual contact surfaces 24 of the arc current path does not occur either.

In a further embodiment, which is not depicted here, instead of straight fingerlike extensions 30 the extensions are helically inserted in one another. In this embodiment, the lateral surfaces of the contacts touch as a result of an axial movement. The current paths during the arc phase and the continuous current phase are almost identical in this embodiment. This helix, which is not depicted in this instance, may also be situated on a supporting structure, for example configured in the form of helical grooves on in each case a tube inside and a tube outside, which are inserted in one another. In principle, besides a helical shape, more complex geometric shapes of the fingerlike extensions 30 are also possible, for example in the form of dovetail structures.

In yet another embodiment, which is not depicted, the contacts of the contact system are closed by a rotational movement rather than by an axial movement. The contact shape in this instance can basically include all of the aforementioned shapes as well. The rotational movement can also merge into an axial movement in the case of helical contacts.

FIGS. 5-8 depict a vacuum circuit breaker tube 2 that corresponds to an ordinary vacuum tube of an ordinary circuit breaker. The contacts that carry the continuous current, which move relative to one another, may fundamentally be embodied as plate contacts, axial magnetic field contacts, radial magnetic field contacts or finger contacts. The contact system 5 carrying the fault current should ensure that the arc 16 cannot switch over from the arc current path 18 to the continuous current path. If this is ensured, an axial magnetic field overlaid in the direction of the ignition arc is advantageous. This serves to prevent a contracted arc 10. In principle, however, what are known as radial magnetic field contacts are also possible. In principle, the contact shapes described are basically capable of interrupting a flow of current by opening the contacts. At the same time, they are in particular capable of setting up a flow of current very quickly by closing, as already described. The ignition electrode 12 already described with reference to FIGS. 1 and 2 is preferably arranged in the center of one of the two contacts 6 or 8. The ignition electronics 20 controlling the ignition electrode 12 are preferably arranged separately from the ignition electrode 12, if need be even outside the vacuum switch. It is advantageous for the ignition electrode to be installed in the fixed contact 8.

Figure 7:
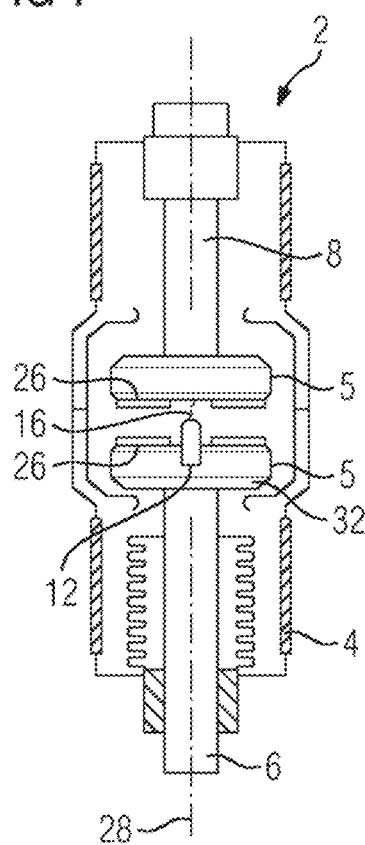
FIG. 7 shows an analogous circuit breaker tube as shown in FIG. 6 with a sacrificial electrode and a contact cutout situated opposite.

FIGS. 5, 6 and 7 have at least one pot-shaped contact 32, the term pot-shaped being interpreted broadly in this instance; in FIG. 5 a small cutout is merely provided in the center of the contact 6. The pot shape shown in FIG. 6 is much more intensely pronounced with a deeper depression and a narrower edge. Furthermore, both contacts 6 and 8 have a pot-shaped configuration in FIG. 6. The ignition electrode 12 is shown depicted in the center of a contact in each case. Both in FIG. 5 and in FIG. 6 and also in FIG. 7, the arc current path 18 runs through the center between the contacts 6 and 8 and is geometrically separated from the continuous current path 22. The continuous current path 22 is not depicted explicitly in FIGS. 5-7, since the contact system 5 is shown only in the open form. The continuous current path 22 of the contact system 5 shown in FIGS. 5-7 then runs via the outer contact regions of the contact surfaces 26 between the contacts 5 and 32.

FIG. 7 shows a further modification, in which the ignition electrode 12 is embodied as a resistant sacrificial electrode or in a resistant contact pin, which is not depicted in this instance. This sacrificial electrode serves as the base of a contracted arc after the ignition of the pre-arcing device, until the continuous current contact surfaces 26 are closed.

Figure 8:
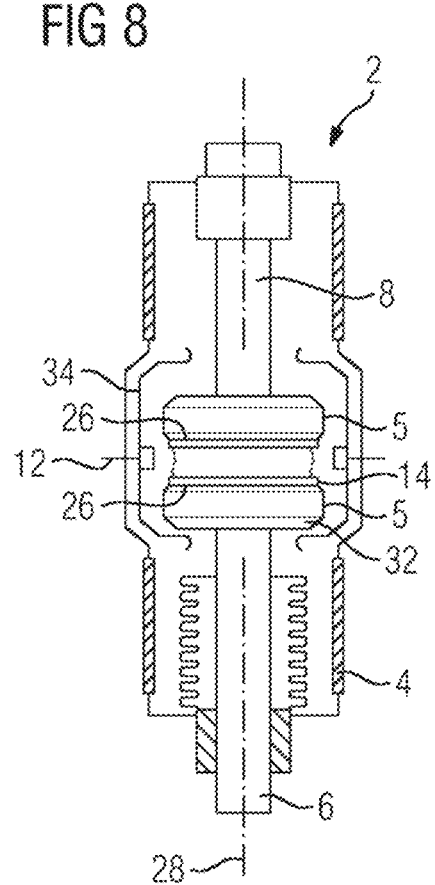
FIG. 8 shows a vacuum circuit breaker tube with an ignition electrode on a vapor shield.

Alternatively, the ignition electrode 12, as depicted in FIG. 8, may also be arranged outside the contacts 6, 8; this is implemented in the case of FIG. 8 by the mounting of the ignition electrodes 12 on a vapor shield 34. The ignited or burning arc 16 then runs at the outermost edge of the contact surfaces 26, depending on the geometric configuration of the contacts 6, 8. With skilled geometric configuration of the contacts 32, the arc 16 shown in FIG. 8 can be adjusted such that in this case too the arc current path 18 and the continuous current path 22 are geometrically separated. This means that the regions of the contact surfaces 24 in which the arc 16 jumps do not meet, and do not make physical contact, when the contact system 5 is closed, as a result of which no undesirable welds occur at this location.

When the vacuum circuit breaker tube described is used in an AC electricity grid, the pre-arcing device 10 should preferably be embodied such that bipolar pre-arcing is rendered possible. This would mean that the arc 16 does not automatically extinguish on passing through the current zero crossing, but rather that it is re-established again. Additionally, pre-arcing is possible both in the positive and in the negative current half-cycle. This can also be achieved by virtue of the contact system 5 having an ignition electrode 12 on both sides that corresponds to ignition electronics in each case or to common ignition electronics 20. Detection of the polarity of the grid or simultaneous ignition of both pre-arcing devices 10 allows the arc 16 to be ignited. A further option for bipolar ignition consists also in greatly increasing the ignition voltage, said ignition voltage being intended to be much higher than twice the grid amplitude, so that an arc is ignited even in the case of an opposite polarity.

In order to carry the current for longer than one half-cycle, for example in the case of slowly closing continuous current contacts, instead of using a second vacuum tube with opposite polarity it is possible to significantly reduce the turn-off capability of the contact system 5. This can be used as a tube for an AC current, since the current is not interrupted permanently after the zero crossing. This presupposes that the current has the correct polarity for the vacuum circuit breaker at the turn-on time.

Appropriate fast drives, preferably a bounce-free drive, are advantageous for the vacuum circuit breaker tube described. A bounce-free drive can be achieved in particular by buffer-storing the kinetic energy of the moving contact when it hits the fixed contact in a spring device, not depicted here, of the drive unit (this includes mechanical springs or gas compression springs).

LIST OF REFERENCE SIGNS 2 vacuum circuit breaker tube
4 vacuum housing
5 contact system
6 moving contact
8 fixed contact
10 pre-arcing device
12 ignition electrode
14 contact piece
16 arc
18 arc current path
20 ignition electronics
22 continuous current path
24 arc current path contact surfaces
26 continuous current path contact surfaces
28 switching axis
30 fingerlike extensions
32 pot-shaped contact
34 vapor shield
36 flanks of the extensions

The invention claimed is:

1. A vacuum circuit breaker, comprising:
    a vacuum circuit breaker tube having a vacuum housing;
    a contact system disposed in said a vacuum housing, said contact system having two contacts being movable relative to one another;
    an electrical pre-arcing unit for igniting an arc along an arc current path, said electrical pre-arcing unit being disposed in said vacuum housing and having an ignition electrode;
    said two contacts including first and second geometrically separated current paths, said first current path being said arc current path and said second current path being a continuous current path;
    said two contacts having finger-shaped extensions along a switching axis, said finger-shaped extensions of said two contacts engaging with one another, said finger-shaped extensions including flanks having contact surfaces of said arc current path, said contacts with said finger-shaped extensions being oriented along said switching axis;
    said continuous current path having contact surfaces making contact with one another in a closed state of the circuit breaker; and
    said contact surfaces of said arc current path not contacting one another in the closed state of the circuit breaker.

2. The vacuum circuit breaker according to claim 1, wherein at least one of said contacts has a pot-shaped configuration with a center, and said arc current path has a contact piece disposed in said center of said at least one pot-shaped contact.

3. The vacuum circuit breaker according to claim 1, wherein said arc current path has a contact piece including said ignition electrode.

4. The vacuum circuit breaker according to claim 1, including a vapor shield, said ignition electrode being disposed on said vapor shield.

5. The vacuum circuit breaker according to claim 1, wherein said contact surfaces of said arc current path have larger surface areas than said contact surfaces of said continuous current path.

6. The vacuum circuit breaker according to claim 5, wherein said surface areas of said contact surfaces of said arc current path are at least twice as large as said surface areas of said contact surfaces of said continuous current path.

7. A method for using a vacuum circuit breaker, the method comprising using the vacuum circuit breaker according to claim 1 as a short-circuiting device for shorting a circuit and for protecting a grid influencing system from a surge.

* * * * *